United States Patent
Plache et al.

(10) Patent No.: US 9,285,800 B2
(45) Date of Patent: Mar. 15, 2016

(54) SYSTEMS AND METHODS FOR ASYNCHRONOUS SEARCHING AND FILTERING OF DATA

(71) Applicant: ROCKWELL AUTOMATION TECHNOLOGIES, INC., Mayfield Heights, OH (US)

(72) Inventors: Kenneth S. Plache, Scottsdale, AZ (US); Joseph Bronikowski, New Berlin, WI (US); Taryl J. Jasper, South Euclid, OH (US); Michael D. Kalan, Highland Heights, OH (US); Douglas J. Reichard, Fairview Park, OH (US)

(73) Assignee: ROCKWELL AUTOMATION TECHNOLOGIES, INC, Mayfield Heights, OH (US)

(*) Notice: Subject to any disclaimer, the term of this patent is extended or adjusted under 35 U.S.C. 154(b) by 440 days.

(21) Appl. No.: 13/653,260

(22) Filed: Oct. 16, 2012

(65) Prior Publication Data
US 2013/0124613 A1    May 16, 2013

Related U.S. Application Data

(60) Provisional application No. 61/558,995, filed on Nov. 11, 2011.

(51) Int. Cl.
*G06F 15/16*    (2006.01)
*G05B 19/418*    (2006.01)

(52) U.S. Cl.
CPC ........ *G05B 19/41835* (2013.01); *G05B 2219/31161* (2013.01); *G05B 2219/31171* (2013.01); *G05B 2219/34246* (2013.01)

(58) Field of Classification Search
CPC .............. G05B 2219/25483; G05B 19/41835; G05B 2219/31161; G05B 2219/31171; G05B 2219/34246
USPC .............................. 709/203, 216–219; 700/83
See application file for complete search history.

(56) References Cited

U.S. PATENT DOCUMENTS

| | | | |
|---|---|---|---|
| 2009/0089394 A1* | 4/2009 | Krueger | 709/216 |
| 2010/0011052 A1* | 1/2010 | Gharabally et al. | 709/203 |
| 2010/0082770 A1* | 4/2010 | Baier et al. | 709/218 |
| 2010/0083226 A1 | 4/2010 | Kowal | |
| 2010/0205271 A1* | 8/2010 | Callaghan | 709/206 |
| 2013/0116022 A1* | 5/2013 | Davison et al. | 463/9 |

* cited by examiner

*Primary Examiner* — Hitesh Patel
(74) *Attorney, Agent, or Firm* — Fletcher Yoder, P.C.

(57) ABSTRACT

An automation control and monitoring system includes a server configured to receive a subscription request from a client component. The subscription request provides one or more criteria to the server. The server is configured to provide a set of data, via a first notification, to the client component based upon the one or more criteria in the subscription request. The server is configured to provide, via additional notifications based on the subscription request, additional sets of data, modifications to the set of data, or both, when additional data or modifications corresponding to the one or more criteria are available.

25 Claims, 7 Drawing Sheets

SYSTEMS AND METHODS FOR ASYNCHRONOUS SEARCHING AND FILTERING OF DATA

CROSS REFERENCE TO RELATED APPLICATIONS

This application is a Non-Provisional of U.S. Provisional Patent Application No. 61/558,995, entitled "Data Querying", filed Nov. 11, 2011, which is herein incorporated by reference.

BACKGROUND

Embodiments of the present disclosure relate generally to the field of automation control and monitoring systems. More particularly, embodiments of the present disclosure relate to utilization of data querying in automation control and monitoring systems.

A wide range of applications exist for automation control and monitoring systems, particularly in industrial settings. Such applications may include the powering of a wide range of actuators, such as valves, electric motors, and so forth, and the collection of data via sensors. Typical automation control and monitoring systems may include one or more components, such as: programming terminals, automation controllers, input/output (I/O) modules, and/or human-machine interface (HMI) terminals.

The human machine interfaces or "HMIs" are commonly employed for monitoring or controlling various processes. HMIs may be employed in numerous different settings, such as in automobiles, aircraft, commercial settings, and a host of other applications. The HMIs may read from or write to specific registers such that they can reflect the operating state of various machines, sensors, processes, and so forth. The HMIs can also write to registers and memories such that they can, to some extent, control the functions of the process. In monitoring functions alone, little or no actual control is executed. Monitoring functions may be performed by other control and monitoring system components as well. It is now recognized that improved methods of monitoring the operating state of control system components are desirable.

BRIEF DESCRIPTION

In accordance with one aspect of the disclosure, an automation control and monitoring system includes a server configured to receive a subscription request from a client component. The subscription request provides one or more criteria to the server. The server is configured to provide a set of data, via a first notification, to the client component based upon the one or more criteria in the subscription request. The server is configured to provide, via additional notifications based on the subscription request, additional sets of data, modifications to the set of data, or both, when additional data or modifications corresponding to the one or more criteria are available.

In accordance with another aspect of the disclosure, a method includes subscribing to a query, via a client component in an automation control and monitoring system, by providing one or more criteria in a subscription request to a server of the automation control and monitoring system. The method also includes receiving, from the server, a first notification including a first portion of data relating to the one or more criteria of the subscription request. Further, the method includes receiving, from the server, one or more additional notifications including additional portions of data relating to the one or more search criteria of the subscription request.

Present embodiments also provide an automation control and monitoring system including a server, a view, a view model, and a data model. The view includes a graphical user interface of the automation control and monitoring system. The view model is configured to request and receive data relevant to the view from the server. The data model includes a model of objects that the server accesses. The server is configured to access the requested data from the data model and provide the requested data to the view model via asynchronous notifications to the view model.

In accordance with another aspect of the disclosure, an automation control and monitoring system includes a client component configured to send a subscription request to a server, the subscription request providing one or more criteria to the server. In addition, the client component is configured to receive a set of data, via a first notification, from the server based upon the one or more criteria in the subscription request. Further, the client component is configured to receive, via additional notifications, additional sets of data, modifications to the set of data, or both, when additional data or modifications corresponding to the one or more criteria in the subscription request are available.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Traditional data repositories within components of an automation control and monitoring system support queries of relatively large data sets. These data sets are often communicated in multiple response packets having smaller pieces of the requested data. For example, a search or filter of 10,000 items might return results in 100 item response packets via multiple notifications. However, these systems may not effectively provide for data that changes after the initial query is submitted, but before the data is returned in a notification. A client component would have to query the server again to receive this updated data.

Present embodiments are directed to asynchronous searching and filtering of data within an automation control and monitoring system. Systems and methods are provided for subscribing to a query via a subscription notification sent from a client component to a server or vice versa. It should be noted that, in this context, the terms "client" and "server" may indicate roles performed by devices and may be interchangeable among devices or even within a single device. The subscription notification may include one or more filter criteria, a set of properties to be returned, and a maximum data return threshold designating a maximum amount of data to be returned in a single notification. Upon receiving the subscription notification, the server accesses a data model of an automation control component and returns the data matching the filter criteria to the client component via one or more asynchronous notifications. In the following discussion, the term "asynchronous notifications" refers to multiple notifications that are not communicated at the same time, but rather are communicated in succession, one after another. The server may provide an initial data set that matches the criteria to the client component via one or more initial notifications, and then provide subsequent updates to the data model via additional notifications as the additional data becomes available. The client component may include a view model that receives the returned data and configures the data for display on a view (e.g., graphical user interface). Such a query mechanism may provide a more accurate set of data in response to a single query submitted by a user. In addition, the communication of updates to the data model may enable a more efficient use of bandwidth between the client component and the server, allowing the use of simpler devices for monitoring state information of the automation control and monitoring system.

Automation Control and Monitoring System

Figure 1:
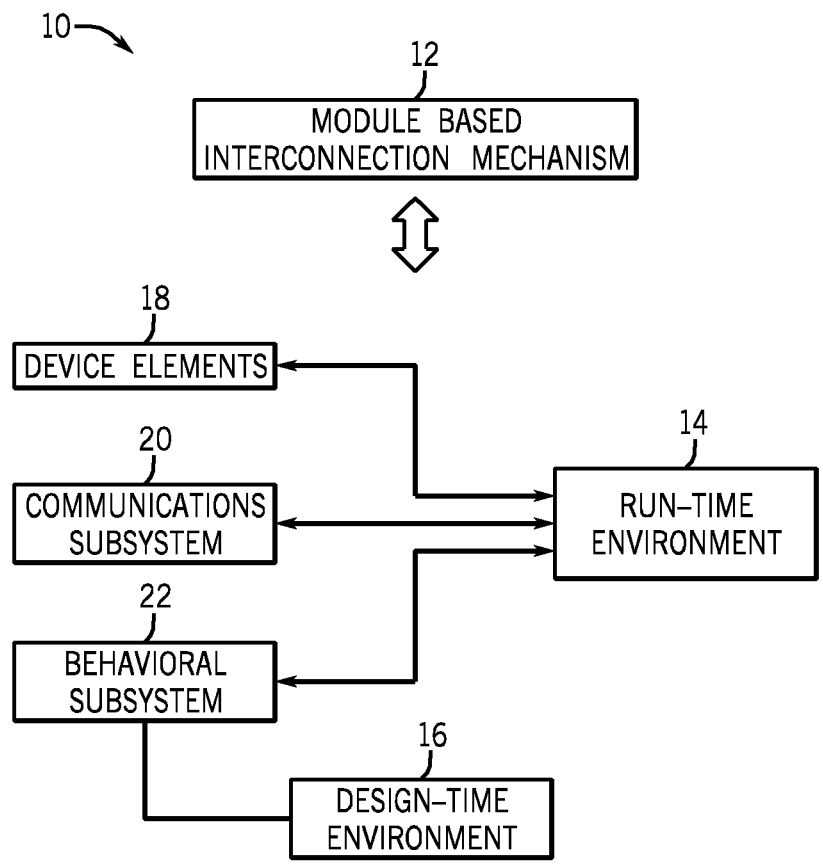
FIG. 1 is a general overview of a framework for portions of an automation control and monitoring system in accordance with certain aspects of the present techniques.

A number of facets, components and processes will be described throughout the following discussion. By way of introduction, a general system overview is in order that situates these features in context. FIG. 1 is a diagrammatical representation of a control and monitoring software framework 10 for an interface in accordance with an embodiment of the present disclosure. The framework 10 facilitates building functional software by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements or objects are provided as stand-alone code that can be individually programmed, pre-written for use, as in a library, customized in their function and appearance in screens, and interconnected to provide information to a user as well as control and monitoring functions. In present embodiments, the device elements or objects may include data that can be provided via asynchronous notifications to components of a control and monitoring system in response to a query.

The framework 10 includes two interrelated software environments that may reside on a single system (e.g., computer). Specifically, a run-time environment 14 enables an operator (e.g., a human user) to interact with an application, such as a process during run-time (e.g., during use of the interface, typically during interaction with or observance of a process in operation). A design-time environment 16 permits a designer to configure the interface and its components. For example, a system may graphically present run-time information to an operator via the run-time environment 14 on a display (e.g., computer or interface device screen). Further, the system may include means (e.g., a keypad) for accepting operator input that can be detected and managed via the run-time environment 14.

The run-time environment 14 includes or provides access to device elements 18. The device elements 18 are software components that may include any accessible or configurable element in a software environment. For example, the device elements 18 include software components, such as "ActiveX" controls or ".NET" components that are managed by the run-time environment 14. "ActiveX" and ".NET" refer to object-oriented concepts, technologies and tools. Those skilled in the art will be well-acquainted with such programming approaches generally. In the present context, such standards should be taken as merely examples, and "device elements" should be understood as including any generally similar components or self-sufficient programs that can be run as quasi-independent elements, sometimes referred to as "objects". Throughout the following discussion, the terms "device elements" or "objects" may be used interchangeably. Other standards and platforms exist for such elements, typically championed by different companies or industry groups.

Because such device elements are basic to certain of the concepts set forth herein, a few words of introduction are in order. Device elements generally include four features: properties, methods, connections (or connection points) and communications interfaces. Properties, in this context, are attributes that can be adjusted, such as to define an image or representation of the element in a screen view, as well as its location on the screen, and so forth. In this context, a method is an executable function (sometimes referred to herein as the elements "functionality" or "state engine"), and defines an operation performed by execution of the element. A connection, in this context, is a link between elements, and can be used to cause data (read from a memory or written to a memory) to be sent to another element.

Specific examples of device elements 18 may include software pushbuttons, timers, gauges, PLC communication servers, visualizations (such as screens that illustrate state of components within the automation control and monitoring system), and applications. In general, virtually any identifiable function may be configured as such an element. Moreover, as discussed below, such elements may communicate with one another to perform a wide range of display, monitoring operations and control functions. It should be noted that device elements 18 do not require special limitations for supporting a design mode. Also, while elements associated with an image are quite useful, particularly for visualizations, many elements may not have a visual representation, but may perform functions within an HMI, such as calculations, or even management and data exchange between other elements.

The run-time environment 14 typically operates using a communications subsystem 20. The communications subsystem 20 is adapted to interconnect the device elements 18. In practice, the communications subsystem 20 may be thought of as including the connections of the device elements 18. However, it may include a range of software, hardware, and firmware that send data to and receive data from external circuits, such as automation controllers, other computers, networks, satellites, sensors, actuators, and so forth.

The run-time environment 14 typically operates using a behavioral subsystem 22, which is adapted to manage the behavior of the device elements 18. For example, responsibilities of the behavioral subsystem 22 may include the following: place and move device elements, modify device elements, group device elements on interchangeable screens, save and restore screen layouts, manage security, save and restore connection lists, and supply remote access to the run-time environment 14. Here again, in practice, such behaviors may be defined as part of the profile (i.e., the "method" or "state engine") of each device element.

In presently disclosed embodiments, the design-time environment 16 may be used to configured the device elements 18 through various thick-client, thin-client, or Web-based implementations. For example, the design-time environment 16 may be implemented on a networked computer workstation or thin-client device that directly accesses the device elements 18 from a server. Such devices may then allow a designer to perform reconfigurations of the device elements 18 used in the run-time environment 14 when an interface is not operating. In some embodiments, the design-time environment 16 may include an advanced implementation of the behavioral subsystem 22 that facilitates direct or indirect manipulation of the run-time environment 14, without impeding or compromising the behavior of the run-time environment 14. That is, design and reconfiguration of the device elements 18 can be done even while an interface is operating. The behavioral subsystem 22 extends access to the run-time environment 14 via remote provision of the design-time environment 16, such as in a conventional browser. The behavioral subsystem 22 allows a designer to interact with and change aspects of the run-time environment 14 of an HMI via a remote programming terminal by serving the design-time environment 16 or aspects thereof to the programming terminal from the HMI. For example, an HMI coupled to a laptop via a network may provide a user with configuration capabilities by serving up a specific design-time environment 16 to the laptop via the network.

Details and examples of how this may be done are provided below. In current embodiments, the design-time environment 16 may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build visualizations without prior knowledge of either the functionality of device elements, or their interrelationships.

By facilitating changes to device elements, the design-time environment 16 allows the designer to make interchangeable design-time models or specialized implementations of the behavioral subsystem 22. A specific example of a design-time implementation of the behavioral subsystem 22 includes a design-time environment 16 that extends access to a run-time environment 14 on an HMI via a TCP/IP connection between the HMI and a remote device. The design-time environment 16 facilitates management of the device elements without compromising run-time performance or security. In one specialized implementation the behavioral subsystem 22 gives designers the ability to manipulate aspects of the run-time environment 14 using a Web browser that is capable of accessing a related interface or HMI. As noted above, this is achieved by using a combination of dynamic content, scripting, and configuration of the device element properties.

Figure 2:
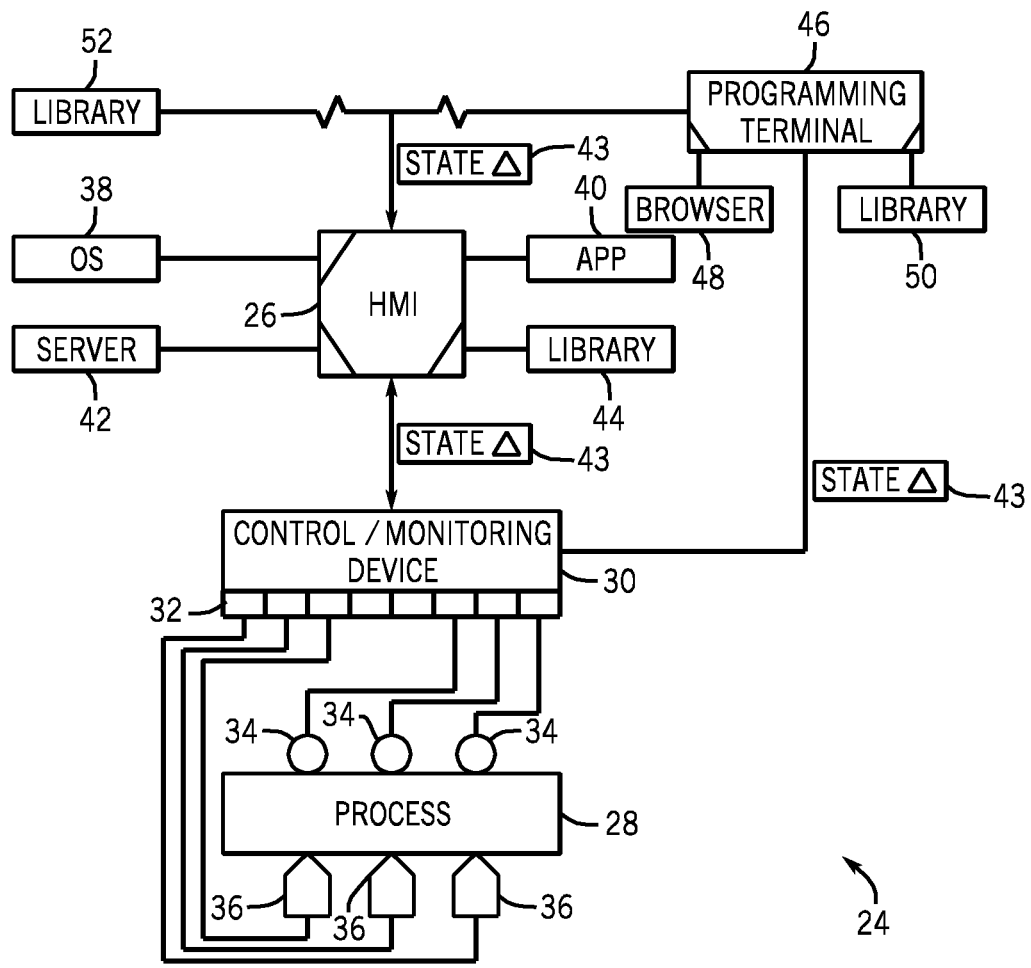
FIG. 2 is a diagrammatical overview of an automation control and monitoring system in accordance with an embodiment of the present techniques.

FIG. 2 is a diagrammatical representation of a control and monitoring system 24, such as for industrial automation, implementing the framework described above in accordance with an embodiment of the present disclosure. The system 24 includes an HMI 26 adapted to interface with networked components and configuration equipment. The system 24 is illustrated as including an HMI 26 adapted to collaborate with components of a process 28 through a control/monitoring device 30 (e.g., a remote computer, automation controller, such as a programmable logic controller (PLC), or other controller). In present embodiments, components of the control and monitoring system 24 may query other system components in order to monitor various operating states of objects throughout the system. For example, the HMI 26 may subscribe to a query of data stored within the control/monitoring device 30 via a server in the control/monitoring device 30, and the server may provide the requested data to the HMI 26 in multiple notifications.

Collaboration between the HMI 26 and components of the process 28 may be facilitated by the use of any suitable network strategies. Indeed, an industry standard network may be employed, such as DeviceNet or Ethernet, to enable data transfer. Such networks permit the exchange of data in accordance with a predefined protocol, and may provide power for operation of networked elements. As noted above, while reference is made in the present discussion to networked (e.g., wired or wireless) systems and to systems incorporating controllers and other equipment, the HMI 26 and programming techniques described may be equally well applied to non-networked components (e.g., GPS displays, game displays, cell phone displays, tablet displays, etc.) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment 14 constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI 26. When loaded, the stored application framework may be adapted to create screens and locate user interface device elements (actual images or pictorial representations corresponding to the elements) in the screens. These applications, screens, and user interface elements are each types of device elements. As described below, the HMI 26 includes a stored application that dictates the layout and interaction of the device elements. The design-time environment 16, which is based on a run-time engine, may also be loaded and resident on the HMI 26. The design-time environment 16 may be adapted to handle advanced features (e.g., security management) for both design-time and run-time environments.

The HMI 26 may be adapted to allow a user to interact with virtually any process. For example, the process 28 may comprise a compressor station, an oil refinery, a batch operation for making food items, a mechanized assembly line, and so forth. Accordingly, the process 28 may comprise a variety of operational components, such as electric motors, valves, temperature sensors, pressure sensors, or a myriad of manufacturing, processing, material handling and other applications. Further, the process 28 may comprise control and monitoring equipment for regulating process variables through automation and/or observation. In general, the process 28 may comprise sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., an automation controller) and may be assigned a particular address in the control/monitoring device 30 that is accessible by the HMI 26. The sensors 34 and actuators 36 may be in direct communication with the HMI 26. The sensors 34 and actuators 36 may be utilized to operate process equipment. Indeed, they may be utilized within process loops that are monitored and controlled by the control/monitoring device 30 and/or the HMI 26. Such a process loop may be activated based on process inputs (e.g., input from a sensor 34) or direct inputs (e.g., operator input received through the HMI 26).

The server software on the interface permits viewing of the development environment, and direct reconfiguration of the interface (particularly of the device elements and their associated appearance and functionality) without the need for special viewing or configuration software. This benefit flows from the fact that the device elements and the design-time environment itself is resident in the HMI 26, and "served up" by the HMI 26 to a browser or other general purpose viewer on a programming terminal 46. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 26, through the programming of the device elements as described below, may be thought of as including instructions for presenting one or more screen views or visualizations, and device elements executed upon interaction with the HMI 26 by reference to the screen views (e.g., pressing a button, touching a location of a screen, and the like). The screen views and device elements may be defined by any desired software or software package. For example, the screen views and device elements may be called by or executed by an operating system 38. The device elements, as discussed above, in accordance with present embodiments, may be objects conforming to ".NET" or "ActiveX", or any other standards, or may utilize proprietary technology. The operating system 38 itself may be based upon any suitable platform, such as Linux, Microsoft Windows, Microsoft Windows CE, Android, iOS, OS-X, etc. As referenced herein, the device elements and tools support Web services or technology for transmitting data over networks (e.g., the Internet). These device elements thus follow a set of rules regarding information sharing and are adapted for use with various scripting and programming languages, as described below. Such device elements enable provision of interactive content to outside applications such as a LAN, WAN, an intranet, an extranet, or even the World Wide Web. Accordingly, the operating system 38 and the various device elements facilitate dynamic configuration of the HMI 26 through a browser 48 by allowing configuration access (e.g., serving up) to the browser 48.

For example, such configuration access includes access for instantiation of device elements. In other words, new device elements can actually be created and implemented from the browser 48. Again, it should be noted that the browser 48 does not require actual functional access. Indeed, in one embodiment, requests via the browser 48 result in a "draw" sequence of operations based on data functionality and content of device elements in a container, thus allowing illustration of the device element representations and access to their configuration without actually serving up functional aspects. This allows for configuration via a remote workstation without necessitating technical support for the remote workstation.

In addition to the operating system 38 and device elements as described above, the HMI 26 includes an application or application layer 40. The application 40, which may itself comprise a device element, facilitates access to and acquisition of information from the various device elements of the HMI 26. In particular, the application 40 represents a first level in a multi-level device element that can be enumerated for execution. The application 40 in a practical implementation may comprise a user application in a variety of forms (e.g., XML, HTML, JSON, or proprietary). The user application is then interacted with by the user or operator, as well as by the designer.

The screen views and device elements may be described as independent executable pieces of software. As noted above, device elements may include functionality by which they read from or write to specific memory or registers of memory, typically in other devices (but which could also be within the HMI 26). For example, a particular function may correspond to writing to or reading from one of the addressable registers 32 of the control/monitoring device 30. In a simple case, for example, an object accesses a piece of data (e.g., a state of a component as determined by one of the sensors 34), and generates an output signal to write a value corresponding to the state of a different networked device. As will be discussed in more detail below, such state information may be communicated via state deltas 43. For example, in the embodiment depicted in FIG. 2, the control/monitoring device 30 and HMI 26 may communicate state information using state deltas 43. Further, the programming terminal 46 may communicate state information with the HMI 26 and control/monitoring device 30 using the state deltas 43. The state deltas 43 may be used to provide updates to data requested via a live query, as described in detail below.

In an industrial control and monitoring context, device elements may emulate operation of a range of physical components, such as a momentary contact push button, a push button with delayed output, a switch, an analog meter display, and so forth. Many pre-programmed device elements may be available for use by the HMI 26. Such functional modules may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements may reside on the HMI 26 to facilitate configuration of the HMI 26. The screen instructions may call upon the device elements or objects 18 for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements or objects 18 associated with the instructions (e.g., with specific locations triggering calls or execution of pre-configured device elements) the desired functions may then be executed. Accordingly, the operator is enabled to interact with a process, typically to change screen views, write to registers, initiate a live query, or command the generation of other output or control signals. In a stand-alone implementation, the interactions may simply recall or store data, change screens, and so forth.

One or more separate interface screens may be employed, with some HMIs having many such screens and a great number of device elements 18. Each device element 18 may, in turn, be uniquely programmed to consider specific inputs, perform specific functions, and generate signals for specific outputs. A plurality of such device elements 18 can be loaded and hosted in a single software "container" (e.g., ActiveX container) as described below.

The HMI 26 may be configured by interacting directly with a panel or screen on the HMI 26 itself (if one is present), but in many cases configuration will be performed remotely from the programming terminal 46. For example, access is provided directly to the resident library 44 and/or operating system 38 and application 40 via a browser 48 or similar application. In a present implementation, no other specialized software is required at the programming terminal 46. Indeed, the server 42 resident on the HMI 26 may provide access to the device elements in the library 44. By storing the device elements in the library 44 directly on the HMI 26, the risk of version conflicts and so forth may be reduced. Additionally, the HMI 26 may be directly connected to the programming terminal 46, or accessed by reference to an IP address (Internet Protocol address) assigned to the HMI 26.

Access control schemes may be used to limit the ability to change screens and device elements. For example, a password or user access status may be required to gain such access. Further, in a presently contemplated embodiment, the programming terminal automatically recognizes the HMI 26 or the terminal on which the HMI 26 is resident as a device upon being coupled to the programming terminal 46 (e.g., similar to an external memory or drive). Thus, once connected to the programming terminal, the HMI 26 may simply be "recognized" as a device that can be accessed (providing the configuration screen and tools described below).

Once the device elements 18 then resident on the HMI 26 are accessible to the programming terminal 46, aspects of the HMI 26 can be modified or updated directly on the HMI 26 via the communication link from the programming terminal 46. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements via the programming terminal 46 and use them to modify the HMI graphic or functionality in a development environment.

It should be noted that additional device elements can be added to the library 44. For example, if a trending device element is not resident on the HMI 26, a user can download such an element to the HMI 26 from a configuration library 50 resident on the programming terminal 46. Alternatively, a user could access the trending device element from a resource library 52 accessible via a network (e.g., the Internet), either directly to the HMI 26 or through the programming terminal 46. This may be particularly beneficial because new and improved device elements can be downloaded to the HMI 26 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 26, version conflicts with the embedded code may be avoided and the necessity for programming terminal software upgrades may be reduced.

To track the state information of the one or more components of the control and monitoring system 24, the components of the control and monitoring system 24 may use a distributed data model representing various aspects of the control and monitoring system 24. For example, the distributed data model may enable multiple cached copies of a data model representing the control and monitoring system 24 to exist within the control and monitoring system 24 (e.g., at one or more of the components of the control and monitoring system 24). The distributed data model may work in conjunction with delta scripting and distributed command handling. The delta scripting may enable one or more components of the control and monitoring system 24 to determine state changes to the data model, generate a delta script that contains only the changes to the data model and/or the entire data model, and provide the delta script to other components of the control and monitoring system 24. The other components may consume the delta scripts and apply the data contained within the delta scripts to a locally cached copy of the data model (e.g., distributed copy contained at one of the components of the control and monitoring system 24).

Figure 3:
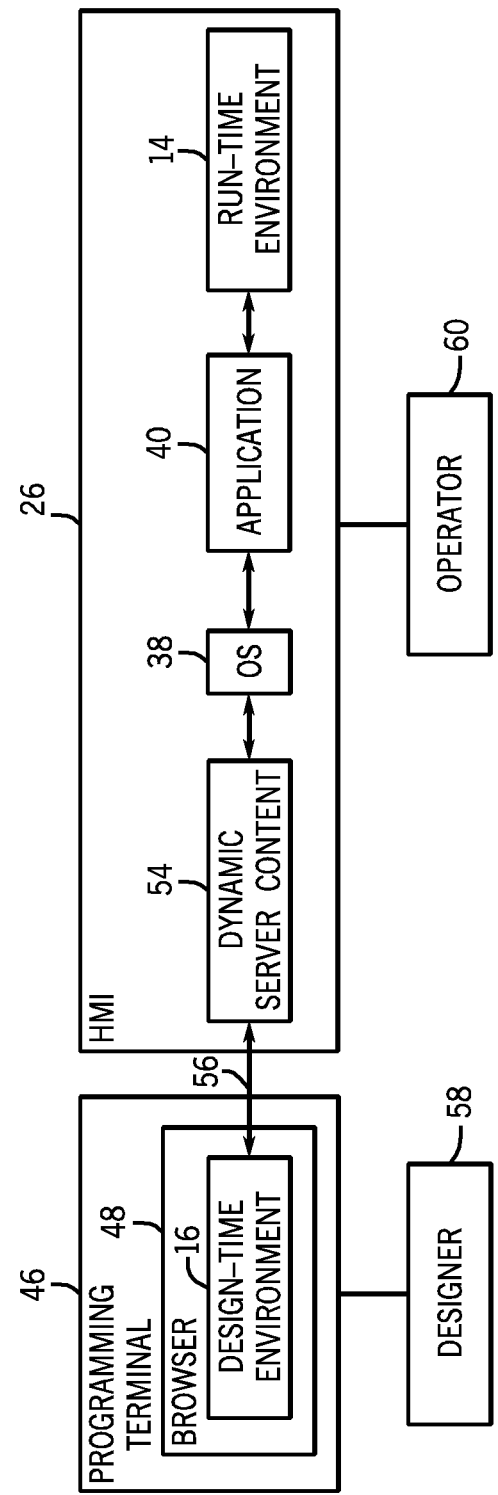
FIG. 3 is an overview of certain of the functional components in an interface and a programming terminal in accordance with an embodiment of the present techniques.

To better illustrate the relationship between the design-time and run-time environments, FIG. 3 provides a high-level flow diagram representing interaction between the HMI 26 and the programming terminal 46. In general, a platform for the HMI 26 and programming terminal 46 will include the operating system or executive software 38, application software 40, as well as any communication software, a microprocessor, a network interface, input/output hardware, generic software libraries, database management, user interface software, and the like (not specifically represented in FIG. 3). In present embodiments, such software may be utilized to query data stored within the control and monitoring system 24. For example, the software may communicate subscription requests to a server specifying a filter or search criteria, or provide notifications of data that matches the criteria to a client component in response to receiving the subscription request.

In the illustrated embodiment, a design-time platform and a run-time platform interact within the HMI 26. The design-time platform provides views that are served as the design-time environment 16 to a desktop personal computer platform (e.g., running a suitable operating system 38, such as Microsoft Windows OS, MAC OS, or Linux) and the run-time platform cooperates with the design-time platform via the operating system (e.g., a Microsoft Windows OS, MAC OS, iOS, Android, or Linux). The design-time platform provides dynamic server content 54, while the run-time platform displays views on the HMI 26 itself (if a display screen is provided on the HMI 26). The design-time environment 16 is displayed in the browser 48 (e.g., Web browser or other general purpose viewer).

FIG. 3 represents at a very high level how the design-time environment 16 interacts with the operating system 38, application 40 and run-time environment 14. The arrow 56 represents dynamic exchange of content between the HMI 26 and programming terminal 46. This dynamic exchange may include communicating requested data between certain run-time and design-time components of the control and monitoring system 24 in response to a query. In present embodiments, the dynamic exchange of content may refer to communication of the requested data, and updates to the requested data, provided via asynchronous notifications. In general, interaction with the design-time environment 16 is the task of a designer 58 who initially configures the HMI screens or visualizations, device elements, their functions and interactions, or who reconfigures such software. The run-time environment 14 is generally interacted with by an operator 60 directly at the HMI 26. It should be noted that while the design-time environment 16 has specific needs, in a current embodiment, it depends heavily on the operating system 38, application 40 and run-time environment 14. The design-time environment 16 and the run-time environment 14 may utilize certain base technologies (e.g., DHTML, HTML, HTTP, dynamic server content, JavaScript, Web browser) to operate respectively in the design-time platform and run-time platform. While, in the illustrated embodiment, the run-time environment 14 and the design-time environment 16 reside on separate platforms, in some embodiments they may reside on the same platform. For example, the design-time platform and run-time platform may be configured as or considered a single platform.

In one embodiment of the present invention, a design-time Web implementation is utilized. This design-time Web implementation offers the speed and flexibility of software running on the design-time platform by using a Web browser (e.g., 48) with DHTML support from the HMI, as noted by the dynamic server content 54 in FIG. 3 and as described below. DHTML is used to perform dynamic manipulation of Web content in the design-time environment 16. Further, the dynamic server content 54 is used in the HMI to serve dynamic Web content to the design-time environment 16. This dynamic client-server environment allows the Web browser to simulate an application running on the design-time platform without requiring a piece of software compiled for a related processor.

Figure 4:
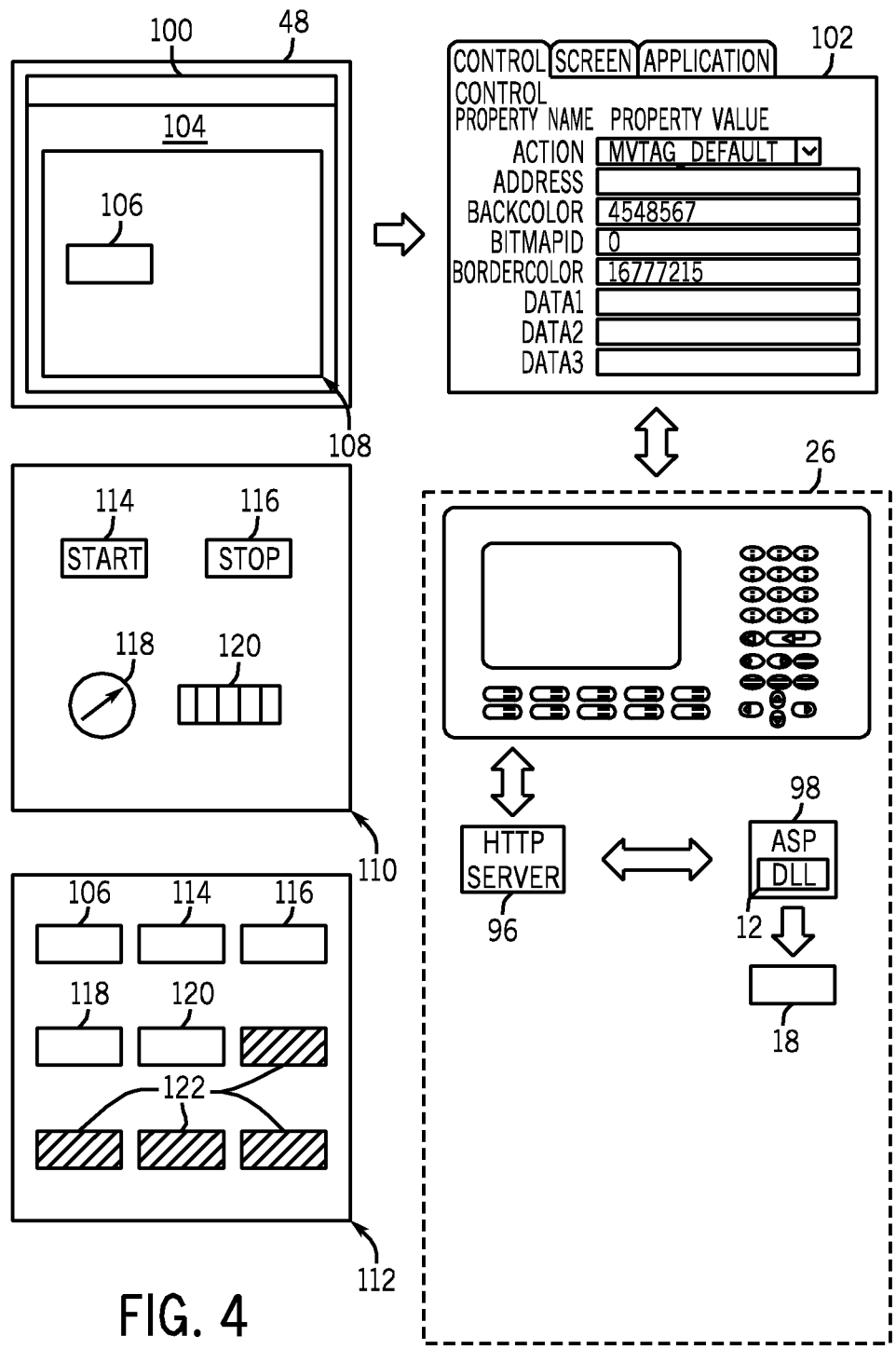
FIG. 4 is an overview of certain views or containers of device elements in accordance with an embodiment of the present techniques.

FIG. 4 is a diagram illustrating one or more device elements 18 in a design-time environment in accordance with embodiments of the present techniques. The diagram includes interactions illustrated by relationships between a display 100 (e.g., a screen for browser display), a property editor 102, and the HMI 26.

The design-time environment represented by the configuration screen or display 100 includes static content 104 and dynamic content. The dynamic content includes images corresponding to any displayed or represented device elements 106 (e.g., virtual on/off button, gauge). In present embodiments, the dynamic content may include run-time data requested by the design-time environment via a query of certain run-time data models of the control and monitoring system 24. That is, the dynamic content displayed may correspond to specific properties of data matching a subscription request sent from the design-time environment. Images for displaying the dynamic content may be updated periodically as asynchronous notifications of updated data corresponding to the request are received by the design-time environment. In one embodiment, an image is specified by an image tag in HTML and is part of a JPEG file created by the HMI 26. The static content 104 may be created by the ASP server or it may preexist in an HTML file. It should be noted that, in some embodiments, designated designers only can edit the static content 104.

In the representation of FIG. 4, the device element representation 106 is contained within a view container 108. As will be appreciated by those skilled in the art, a container generally defines a portion of a processing space in which certain device elements are opened and ready for use. The container 108 may thus correspond to a first view container that includes only the elements viewable within the current screen. As discussed above, many such screens may be provided in the HMI 26. Other screens, such as alternative control or interface screens may be provided in other view containers, such as a container 110. In general, to speed the operation (e.g., changing between screen views) of the HMI 26, such view containers are predefined and associated with one another by definition of the individual device elements with which they are either associated or within which representations of the device elements are provided. A global container 112 may be defined to include all of the device elements necessary for the various view containers, as well as other elements that may not be represented in any view container. As illustrated in FIG. 4, therefore, view container 108 includes the virtual button 106 which performs a "jog" function and is manifested by a representation in a first screen. The new container 110 includes several components, such as a "start" button 114, a "stop" button 116, a virtual gauge 118 and a digital readout 120. The global container 112, then, will include all of these device elements for the various view containers, as well as any device elements 122 that are required for operation of the viewable device elements but that are not themselves viewable. Such device elements may include elements that perform computations, trending, communications, and a wide range of other functions.

FIG. 4 also illustrates a property editor 102 in which a user may access various properties of the element 106. As discussed above, the element 106 may also include connections and text associated with the element 106, which may also be configured by the user via an editor, similar to the property editor 102.

In an embodiment, the property editor 102 may interact with the HMI 26 via a query string from the browser (e.g., browser 48 of FIG. 2) to a server 96 (e.g., HTTP server) that is resident on the HMI 26. The server 96 cooperates with an ASP server 98 including the module based interconnection mechanism 12, such as a dynamic-link library (DLL) to receive and respond to queries. The DLL allows for storage of executable routines as separate files, which can be loaded when needed or referenced by a program. In the example set forth above, upon receiving the call, the page is reloaded by the ASP server 98 and the query string is initially parsed, resulting in evaluation of the move command. Server side scripts then access the device element 18 represented by the image 106 and update its location property. The new property information is then updated on the page and the page is passed to the browser 48. In present embodiments, similar queries may be performed between different components of the control and monitoring system 24. For example, a server that is resident in an automation controller may receive and respond to queries sent from the HMI 26, in order to provide data relating to one or more criteria submitted in a subscription request. Present embodiments also allow for live queries, in which the component subscribing to the query receives updates to the data set as these updates become available.

Data Querying

Figure 5:
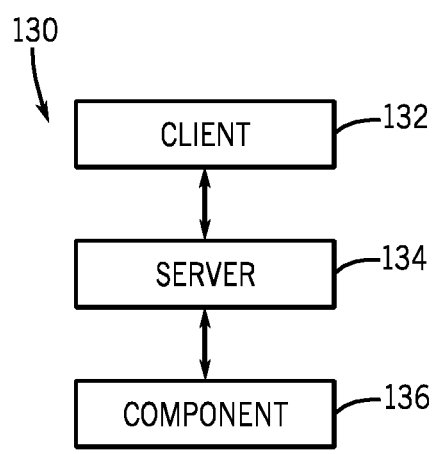
FIG. 5 is a block diagram of a client component in communication with a server for querying a component of an automation control and monitoring system device in accordance with an embodiment of the present techniques.

As previously discussed, the components of the control and monitoring system 24 may operate independently in a loosely coupled, asynchronous fashion. At times, it may be desirable for one component of the control and monitoring system 24 to query one or more other system components to determine their state of operation. For example, the HMI 26 may query the control/monitoring device 30 to receive data indicative of a current operational state of the process (e.g., as detected by the sensors 34). FIG. 5 is a block diagram that broadly illustrates certain functional components 130 used to perform such data querying. The functional components 130 include a client component (e.g., client 132), a server 134, and a component 136 being queried. In some embodiments, one or more of these features may be representative of a single device. The client 132 may subscribe to a query via the server 134, which acts as the querying mechanism. In the example given above, the HMI 26 would be the client 132, and the control/monitoring device 30 would be the component 136 being queried. The role of the server 134 could be played by the HMI 26, the control/monitoring device 30, or a separate device. The client 132 and the server 134 are in communication with each other. As described in greater detail below, the client 132 may subscribe to a query by providing one or more criteria to the server 134 via a subscription request. The server 134 then provides the set of data to the client 132 based on the one or more criteria in the subscription request. To accomplish this, the server 134 acts as a manager of the data requested from the client 132, aggregating the query results by populating data into a data repository, and then pushing the data toward the client 132. The data repository may be a database (e.g., tag database) or any other storage medium capable of providing access to the data (e.g., automation data, configuration data, measurement data). The data populated in the data repository may include one or more properties of the data requested via the subscription request, and the desired properties are sent from the data repository in notifications that can be handled by the client 132. That is, the server 134 may provide the set of data to the client 132 in multiple notifications depending on the criteria, the size of the data set, and the data handling capability of the client 132, among other things.

FIG. 5 illustrates one arrangement of the functional components 130 used for such data querying, but different arrangements of these functional components 130 may be possible as well. This is because the functional components 130 are effectively layers that perform specific roles within one or more physical components of the control and monitoring system 24. These different roles are accomplished through different data models maintained in the client 132, the server 134, the component 136 being queried, etc. Therefore, one or more of the functional components 130 may be bundled within a single system component (e.g., control/monitoring device 30). In particular, the server 134 may be pushed down into the control/monitoring device 30 being queried. This allows the control/monitoring device 30 to process the query, populate the data into an appropriate data record, and evaluate the data. The HMI 26 may act as the client 132, sending a subscription request to the control/monitoring device 30 in order to receive the desired data. The data received may be used to produce visualizations in a view of the HMI 26.

It should be noted that the client 132 may include any component of the control and monitoring system 24 that needs to get information from another component. For example, the client 132 could include a controller, the HMI 26, a phone, a design tool (e.g., programming terminal 46), a run-time component, a smart I/O device, etc. As a specific example, the client 132 may itself be an automation controller querying another automation controller. In this situation, one of the controllers would be the client 132, while the other controller (the one being queried) would be the component 136. This may be particularly useful in situations where the designer 58 is configuring tag references of the client controller based on other devices within the control and monitoring system 24. For example, an operator may perform a query requesting a certain set of equipment that can be used for a task in the process 28, such as mixing in a stainless steel tank. The query results, which may come from any number of queried components 136 (e.g., controllers), would include a name and/or other properties of every piece of equipment throughout the system that can be used to mix in a stainless steel tank. If each controller has a processor capable of executing the role of the server 134, the roles of the controllers may be reversed.

Figure 6:
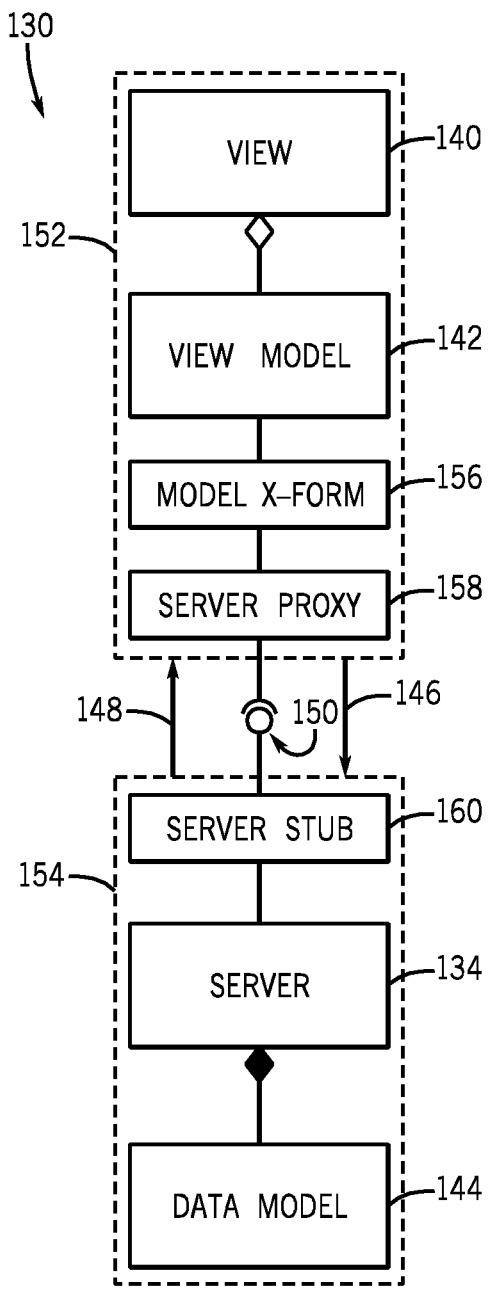
FIG. 6 is a schematic block diagram of functional components used to perform a query in accordance with an embodiment of the present techniques.

Having now discussed the general layers used for maintaining data models relevant to a query, a more detailed discussion of the data models themselves will be provided. FIG. 6 is a schematic block diagram of the functional components 130 used for querying, focusing specifically on the interactions between the client 132 and the server 134. The functional components 130 include, among other things, a view 140, a view model 142, and a data model 144. These components may be combined and/or incorporated into the functional components 130 shown in FIG. 5.

The view 140 includes a graphical user interface (GUI) of the control and monitoring system 24, and more specifically, of the client 132 subscribing to a query. In certain embodiments, the view 140 is implemented using data binding mechanisms of a particular GUI rendering technology to connect to the view model 142. The view model 142 includes a model for the view 140 in an application (e.g., client 132). The view model 142 is configured to request (arrow 146) and receive (arrow 148) data relevant to the view 140. In this way, the view model 142 may expose data relevant to the view 140, as well as behaviors for the view 140. These behaviors may include commands executable on the data received by the view model 142, such as instructions for rendering the data for the view 140. The server 134 is configured to access the requested data from the data model 144 and to provide the requested data to the view model 142. In presently contemplated embodiments, the server 134 is configured to provide the requested data via asynchronous notifications to the view model 142. Asynchronous notifications include notifications that are sent sequentially, one after another, instead of at the same time. When asynchronous notifications are communicated between two components, an asynchronous notification is provided only after the most recent notification has been received by either of the components. The data model 144 is a model of the objects exposed by the server 134 in response to a subscription request from the view model 142. The data model 144 shown in FIG. 6 may relate to the system components illustrated in FIG. 5 in the following way. The data model 144 may be a tag database into which the server 134 populates data associated with objects from the component 136, as requested by the client 132. In this way, the server 134 may provide the client 132 with asynchronous, networked access to the objects and their associated data. The asynchronous, networked access includes communication of live operation data from the objects in one or more components to the client 132 over one or more connections. The server 134 may aggregate the data matching the desired criteria from the components into the data model 144, and then communicate this data to the client 132 through one or more asynchronous notifications.

FIG. 6 illustrates a number of the functional components 130 grouped together on either side of a connection 150. This connection 150 is between client components 152 generally associated with the client 132 and server components 154 generally associated with the server 134. In the illustrated embodiments, the client components 152 include the view 140, the view model 142, a model transformation component 156, and a server proxy 158; the server components include the server 134, the data model 144, and a server stub 160. In other embodiments, certain of these components (e.g., the model transformation component 156, server proxy 158, and/or server stub 160) may not be present, or may be combined with each other. The client components 152 may be packaged together in any combination or as separate components. For example, the model transformation component 156 and the server proxy 158 may be packaged together, while the view model 142 is maintained in a separate package.

As mentioned above, the view 140 is a GUI of the control and monitoring system 24. That is, the view 140 may include a GUI widget that ultimately provides a visualization of information accessed by the view model 142. Such visualizations are provided to a display of the client device, which may be a phone, HMI, smart I/O device, tablet, programming terminal, etc. The view 140, therefore, may be any list-oriented GUI widget that supports rendering concepts such as data binding and routed events.

The view model 142 represents a client-side data collection (cache) of data received from the data model 144, and the view 140 binds to the view model 142 in order to provide a visualization of the cached information. The view model 142 may determine an appropriate way of handling the information requested from the data model 144, and configure the subscription request for the server 134 accordingly. For example, the view model 142 may determine to load certain data from the data model 144 while delaying to load other data from the data model 144, because of differences in the expected latency for populating the data model 144 with different types of data. In addition, the view model 142 may determine to request only a certain amount of data in each notification sent from the data model 144, based on an amount of data expected to be received and/or an amount of data that can be handled by the view model 142.

The server 134 may advertise its services via an interface 150 provided by the server stub 160. The client 132 discovers the services exposed by the interface 150 and connects to the advertised service via the server proxy 158. As shown in FIG. 6, this connection allows the view model 142 to consume the interface of the server 134 and provide an easy to consume cached model of the received data to the view 140. In some embodiments, the same view model 142 may be shared by multiple views 140, so that multiple users can visually access the same information queried from a component of the control and monitoring system 24. The server 134 may provide a message-based contract to access data within the data model 144, such that any data requested from the data model 144 is communicated through the server 134 in a specific message format. As a consequence, the data communicated across the connection 150 in response to one or more requests may be message-based data, while the view model 142 is configured to handle object oriented data. To accommodate this, the model transformation component 156 may convert message-based data received from the server proxy 158 to object oriented information in the view model 142.

The server proxy 158 and the server stub 160, each based on the server contract, may be used to establish the connection 150 between the server 134 and the view model 142. On the client side, the server proxy 158 includes machine-readable code with instructions to connect the view model 142 to the server 134 and to transform any asynchronous notifications received from the server 134 such that the data may be interpreted by the view model 142. That is, the view model 142 interacts with the server proxy 158 to establish a connection and communicate with the server 134. As noted previously, the model transformation component 156, which may be part of the same package as the server proxy 158, converts the message-based data received from the server proxy 158 to object-oriented data for the view model 142. The server stub 160 may include a mechanism for starting up the server 134 and listening for request notifications from the client 132. More specifically, the server stub 160 includes machine-readable code with instructions to receive and transform a request sent from the view model 142 to the server 134, such that the request may be interpreted by the server 134. The code provided by the server stub 160 may enable the server 134 to respond to notifications from the client 132. A server framework used by the server proxy 158 and the server stub 160 may support different programming technologies (e.g., C++, Java, and .NET).

Figure 7:
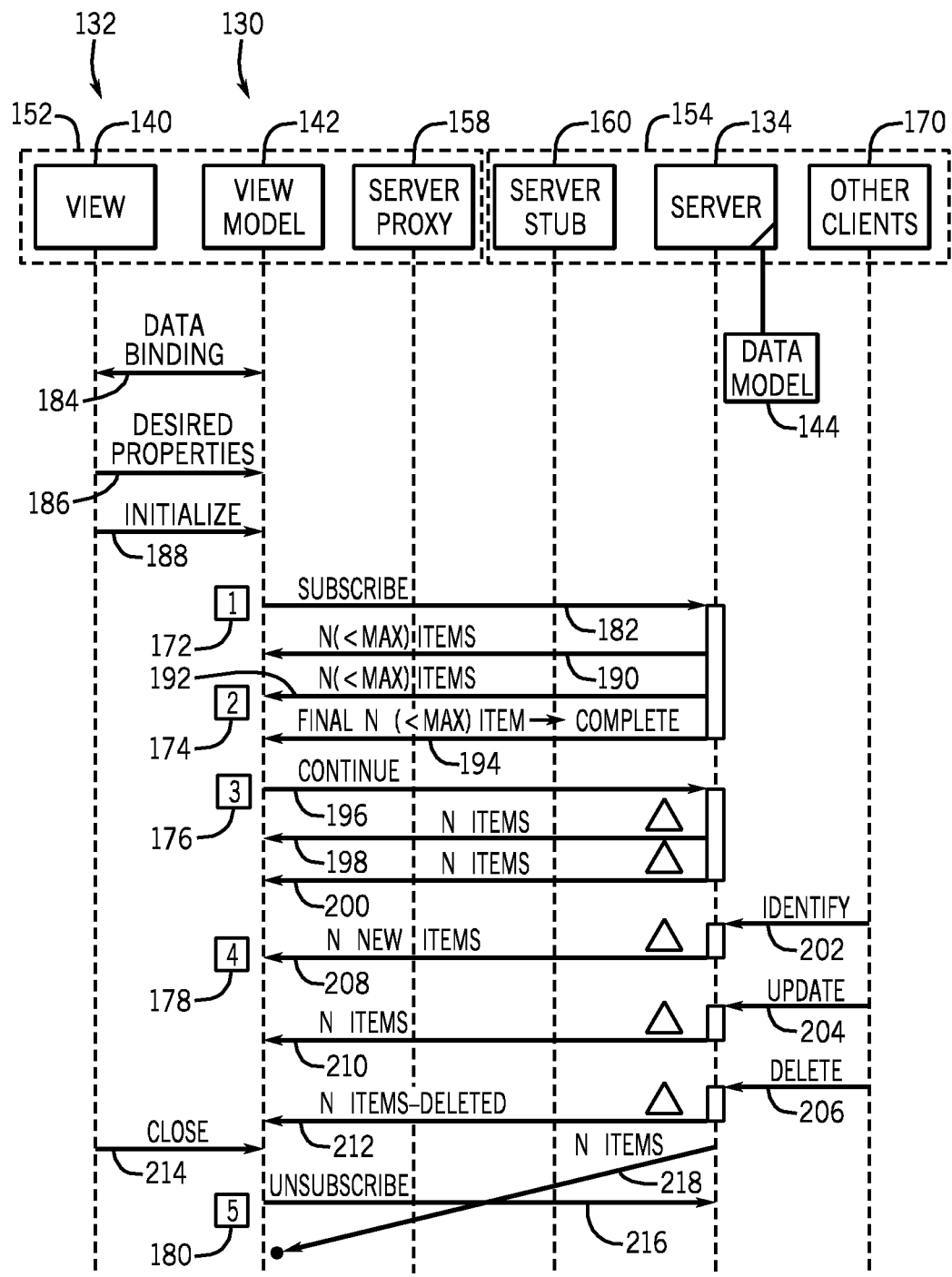
FIG. 7 is a diagram illustrating communication between the functional components of FIG. 6 in accordance with an embodiment of the present techniques.

FIG. 7 is a diagram illustrating communication between the functional components 130 of FIG. 6. In the illustrated embodiment, the functional components 130 that are interacting include the view 140, the view model 142, the server proxy 158, the server stub 160, the server 134, and other clients 170. However, it should be noted that the interactions shown in FIG. 7 occur generally between the view 140, the view model 142, the server 134 (which includes the data model 144) and the other clients 170. Five different operations are depicted between these functional components 130, as indicated by blocks numbered 1 through 5. A first block 172 represents subscribing to a query, a second block 174 represents receiving one or more initial notifications, and a third block 176 represents sending an asynchronous continue notification. A fourth block 178 represents receiving item update notifications, and a fifth block 180 represents unsubscribing to the data. Each of these specific operations may be performed by the view model 142 interacting with the server 134, and the operations are described in detail below. It should be noted that the names and parameters of the operations performed between these components are exemplary, and may be different in other embodiments.

The operation denoted by the first block 172 includes the view model 142 (e.g., in the client 132) subscribing to a query of the data model 144 accessed by the server 134. To accomplish this, the view model 142 provides one or more criteria to the server 134 via a subscription request 182. The view model 142 may provide a data filter for the set of data in the subscription request 182, and the view model 142 may further provide a specific set of properties to be returned for the requested data set. In addition, the view model 142 may provide a limit designating a maximum amount of data to be returned in a notification from the server 134. This may be particularly useful for querying large data sets using a client 132 whose view 140 can only support a limited amount of data. In some embodiments, the filter, sort, and property set selection capabilities sent in the subscription request 182 are specific to the server 134, and may depend on the device in which the server 134 is deployed (e.g., a certain type of controller). The view model 142 may request a data set and subscribe to changes in the data set through the same subscription request 182. This is referred to as a "live query" since the view model 142 only sends one notification to the server 134. The server 134 in return provides continually updated information relating to the requested data set via asynchronous notifications. In certain embodiments, the client 132 may specify in the subscription request 182 whether or not the server 134 should provide update notifications based on changes to the data set during the query. This would enable the client 132 to request either a one-time query or a live query, depending on the information desired from the data model 144. The live query makes use of asynchronous notifications to communicate updates to an initial data set received from the server 134. The one-time query may also use asynchronous notifications, in order to provide an initial data set requested by the client 132 when the initial data set is too large to send in one notification.

It should be noted that before sending the subscription request 182, certain interactions may occur between the view 140 and the view model 142. These interactions include, among other things, data binding 184, identifying the desired properties 186 to be returned by the server 134, and initializing 188 the view model 142. The data binding 184 may enable the view 140 to include appropriate visualizations based on data received by the view model 142. The desired properties 186 include properties that are stored in the data model 144 and may be accessed by the server 134, and these desired properties may be input by a user via the view 140. The initialization 188 may signal the view model 142 to provide the subscription request 182 based on the desired properties 186.

Upon receiving the subscription request 182 sent from the view model 142, the server 134 is configured to provide the requested set of data, via one or more initial notifications. In the illustrated embodiment, the server 134 provides an initial set of the requested data set in three notifications 190, 192, and 194, as shown in the second block 174 of FIG. 7. The server 134 may send multiple notifications in order to notify the view model 142 of the items that match the request sent from the view model 142. That is, the server 134 is configured to provide the notifications 190, 192, and 194 based on the one or more criteria sent in the subscription request 182. In addition, each of the matching items returned to the view model 142 are items in the data model 144 that include some or all of the properties specified in the subscription request 182.

Present embodiments support queries of large data sets, which may return the requested data in multiple response packets having relatively smaller pieces of the requested data. This may provide relatively easier and/or faster communication of information returned to the view model 142 in response to a request. A search or filter of 10,000 items of data or objects in the control/monitoring device 30, for example, may be returned in 100-item response packets, each packet being returned via a separate notification 190, 192, or 194. Indeed, each of the notifications 190, 192, and 194 may provide a finite amount (e.g., N) of the requested data to the view model 142, this finite amount being less than a maximum amount of data. Again, this maximum amount of data may be provided to the server 134 in the subscription request 182. The view model 142 may determine the maximum amount of data based on certain capabilities of the view 140. In certain embodiments, the view 140 may include a GUI configured to display only a certain amount of data at a time (e.g., in a window appropriate to the client device). In response to receiving a limit designating a maximum amount of data via the subscription request 182, the server 134 may limit the first notification 190 to the maximum amount of data, and then provide the notifications 192, 194 of the requested data that could not be sent in the first notification 190 due to the limit. Like the first notification 190, each of the notifications 192 and 194 do not exceed the maximum amount of data. Unlike traditional systems, present embodiments allow for changes in the data set initially communicated via the notifications 190, 192, and 194 to be provided to the view model 142 via additional notifications, as detailed below.

In some embodiments, the server 134 may be configured to provide a specific portion of the initial data set matching the query in specific notifications (e.g., 190, 192 or 194) when the portion of data is not immediately available. In other words, the server 134 may provide an update of the set of data in an additional notification when the update of the set of data is not immediately available for the server 134 to send. Even when the amount of data does not exceed a maximum data return threshold provided in the subscription request 182, the server 134 may provide the data in separate notifications, if not all the requested properties of the data are immediately available. Indeed, some of the requested items may require relatively time-consuming data processes that could be performed in the background while the server 134 sends the first notification 190. After receiving the subscription notification request 182, the server 134 may detect a first (low latency) portion of the data that is available for transmission and to detect a second (high latency) portion or update of the data that is not available for transmission. The server 134 may then send a first asynchronous notification (e.g., first notification 190) with the first portion of data to the view model 142, and send a second asynchronous notification (e.g., second notification 192) with the second portion of data when the second portion is available for transmission. For example, the server 134 may be a tag server that recognizes a potential for latency in calculating localized descriptions for the requested tags because of pass through behavior related to the tags' data types. That is, each type of tag in the control/monitoring device 30 may include the same data type, while each type of tag may include a unique tag description. Therefore, it may take the server 134 longer to determine the descriptions than the data types associated with each given tag requested by the view model 142. In response to this inherent delay, the server 134 may aggregate and send the data type information in an earlier notification and send the description information in one or more subsequent notifications. Although this example is directed to the server 134 sending two notifications 190 and 192 containing low and high latency portions of data, it should be noted that the server 134 may send any number of separate notifications containing portions of data with different relative latencies.

Regardless of the number of notifications initially sent from the server 134 to the view model 142, the server 134 may be configured to provide a complete indicator included with the last notification (e.g., 194). However, when the functional components 130 are performing a live query, the data received by the view model 142 may require repeated updates to reflect changes in the live automation data in the data model 144 accessed by the server 134. To accommodate such updates, the view model 142 may send a continue notification 196 to the server 134, as indicated by the third block 176. The continue notification 196 is an asynchronous subscription request sent to the server 134, through which the view model 142 may subscribe to changes or modifications in the data model 144 of the server 134. The server 134 then provides these changes to the view model 142 in additional notifications 198 and 200. These additional notifications 198 and 200 may include only the pieces of data from the data model 144 that have changed since the initial subscription request 182 was received. This may conserve bandwidth between the client components 152 and the server components 154, as the server 134 is allowed to send just the changed information from the data set, instead of the full state information of the data set. The method for providing such state deltas is detailed below. The view model 142 may periodically send continue notifications 196 to the server 134 and receive additional notifications with updates to the data sets.

In some embodiments, the continue notification 196 may be an asynchronous subscription request that specifies a different data filter and/or a different set of properties to be returned in the additional notifications 198 and 200. This may allow for dynamic adjustment of the data filter and/or desired properties without the client 132 submitting an entirely new subscription request. The data model 144 may be dynamically adjusted based on the data that matches (or no longer matches) the desired criteria, and the server 134 may provide the desired properties of the updated data model 144 to the client 132 via the additional notifications 198 and 200. All of this may be accomplished without the client 132 tearing down the first subscription request 182 and starting over with the new data filter and/or properties.

Again, the data model 144 that is accessed by the server 134 may be dynamically changing throughout operation of the control and monitoring system 24, due to live automation system execution. Specifically, changes may occur in the form of live production data, detected by the sensors 34 of the process 28. Changes also may occur in the form of configuration of the data set by an operator (e.g., through the programming terminal 46). In either of these cases, the changes to the data model 144 occur through interactions with the other clients 170, which may include process components, automation controllers, I/O devices, configuration stations, etc. After a user submits the subscription request 182 from the view model 142 to the server 134, the other clients 170 may identify 202, update 204, or delete 206 certain information within the data model 144. That is, the other clients 170 may identify 202 additional data corresponding to the one or more criteria of the query, update 204 data corresponding to the one or more criteria, delete 206 data corresponding to the one or more criteria, or a combination thereof. The server 134 may be configured to provide item update notifications 208, 210, and 212 corresponding to the identified additional data, updated data, and deleted data, respectively, to the view model 142. The item update notifications 208, 210, and 212 may also be referred to as modification notifications. This is the fourth operation shown in the illustrated embodiment, as indicated by the fourth block 178. In certain embodiments, only the changed data that matches the filter criteria of the original subscription request 182 are sent. That is, whenever a change is made to the data model 144, the server 134 may publish the change to determine whether the data matches any query results. It should be noted that the item update notifications 208, 210, and 212 may be provided asynchronously, allowing the other clients 170 to trigger such notifications as soon as the information is affected. In some embodiments, the item update notifications 208, 210, and 212 follow the same pattern as the notifications 190, 192, and 194 and/or the additional notifications 198 and 200. This enables the server 134 to provide the item update notifications 208, 210, and 212 concurrently with these other types of notifications as the updates become available.

The fifth block 180 shown in FIG. 7 illustrates an unsubscribe operation performed by the functional components 130 when a user desires to stop querying the control and monitoring system 24. This operation may be prompted through a user's interaction with the view 140, such as closing the view 140. The view 140 may communicate a close signal 214 to the view model 142, and the view model 142 subsequently unsubscribes to the original query via an unsubscribe notification 216. Upon receiving the unsubscribe notification 216, the server 134 stops sending update notifications to the view model 142. The server 134 may be configured to continue the query until such an unsubscribe notification 216 is received. There may be updates and additional information received within the data model 144 after the user ends the query (e.g., close signal 214) but before the subscription notification 216 reaches the server 134. To address these scenarios, the server 134 may be configured to ignore any additional item updates 218, instead of providing them to the view model 142.

As noted above, the subscription request 182 provided by the view model 142 may include a data filter, a set of one or more criteria, and/or a set of properties to be returned. The following example shows one such query, performed as outlined in the different operations of FIG. 7. A user may desire to query the control and monitoring system 24 for certain objects, such as objects that have a temperature over 100 degrees Fahrenheit. The user may specify that the server 134 returns the name and description of the objects operating at these temperatures. The view model 142 accessed by the user may send a corresponding subscription request 182 to the server 134, which is configured to access any connected control/monitoring devices 30. The server 134 queries temperature data stored in the registers 32 of the control and monitoring devices 30 to determine which of the control objects are currently operating above 100 degrees Fahrenheit. The server 134 may provide the names of the components above 100 degrees to the view model 142 in one or more initial notifications, depending on the capabilities of the view 140 (e.g., window size) and number of components found. The descriptions of the components may be provided in subsequent notifications, since it takes the server 134 longer to determine the descriptions than the names. As these description notifications are provided, the temperature of one of the determined components may drop below 100 degrees. At the same time, a designer may update a name of one of the objects operating at over 100 degrees. The server 134 may then provide one or more asynchronous notifications to the view model 142 to identify initial component descriptions that had not been sent to the view model, to delete the component name/description that had dropped below 100 degrees, and to update the name of the component whose name had been changed. When finished with the query, the user may close the view 140, and the view model 142 may unsubscribe from any additional updates.

Other features may be possible for the functional components 130 used to perform such queries within the control and monitoring device 24. As mentioned previously, the server 134 may be configured to perform a live query as described above, or a static query that ends once the complete notification 194 is sent to the view model 142. In certain embodiments, a user may select a static or live query option, and the selected option may be communicated in the subscription request 182. Although the server 134 is configured to provide updates to the data as they become available, the view 140 may include a "refresh" button that a user can select in order to indicate a lack of confidence in the information displayed and to ask for confirmation that the information is up to date. This may prompt the view model 142 to send a continue notification 196 to the server 134 requesting any additional updates. The view 140 also may include an option for the user to request additional properties relating to the criteria sent in a query. When such a request is made, the view model 142 may provide a continue notification 196 to the server 134 requesting the additional properties stored in the data model 144. In certain embodiments, more than one view 140 may access the same view model 142, such as when multiple collaborative users desire to access the same data queried from the control and monitoring system 24. The multiple views 140 also may allow different users to select different properties of the same data set, which is maintained or aggregated in the shared view model 142. The functional components 130 performing a query may be configured to time out after a certain amount of time spent querying components of the control and monitoring device 24. That way, if a user forgets to end the live query, the session may stop on its own instead of continuing indefinitely. In some embodiments, the view 140 may provide a warning that the session is about to time out and request validation from a user to determine if they want to continue the query.

Figure 8:
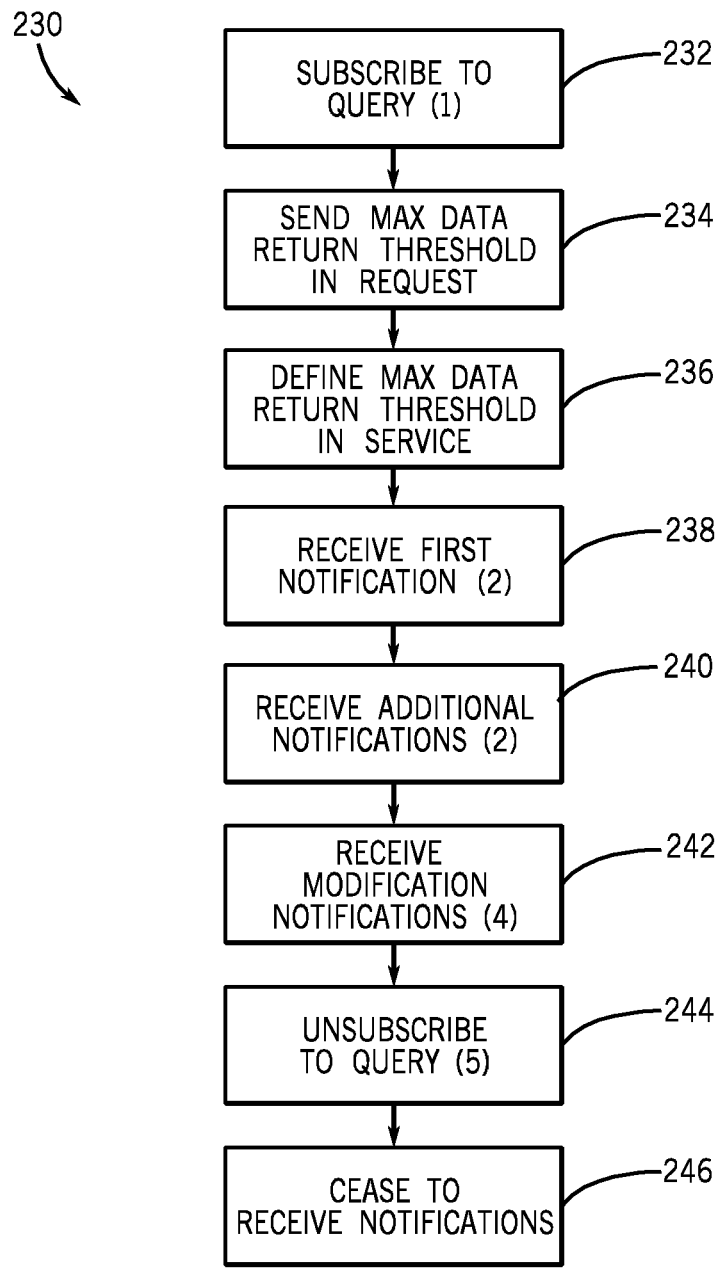
FIG. 8 is a process flow diagram illustrating a method for performing a query in accordance with an embodiment of the present techniques.

FIG. 8 is a process flow diagram illustrating a method 230 for performing a query using the functional components 130 described above. It should be noted that the method 230 may be implemented as a computer or software program (e.g., code or instructions) that may be executed by a processor (e.g. in the client 132) to execute one or more of the steps of the method 230. Additionally, the program may be stored in any suitable article of manufacture that includes at least one tangible non-transitory, computer-readable medium that at least collectively stores these instructions or routines, such as a memory or storage component of the control and monitoring system 24. The term non-transitory merely indicates that the medium is not a signal. As described below, different parts of the method 230 may correspond to operations described in detail with reference to FIG. 7.

The method 230 includes subscribing (block 232) to data, via a component (e.g., view model 142) in the automation control and monitoring system 24, by providing one or more criteria in a request notification to the server 134 of the control and monitoring system 24. This is similar to the operation described with reference to the first block 172 of FIG. 7. In the illustrated embodiment, the method 230 also includes sending (block 234) a maximum data return threshold in the request notification. This may keep the server 134 from returning more information in a single notification than can be managed by the client 132. The method 230 may also include defining (block 236) this maximum data return threshold in the server 134 that receives the initial request. The method 230 further includes receiving (block 238), from the server 134, a first notification comprising a first portion of data relating to the one or more criteria, and receiving (block 240), from the server 134, one or more additional notifications including additional portions of data relating to the one or more search criteria. This corresponds to the operations indicated by the second block 174 of FIG. 7. It should be noted that the first portion of data and the additional portions of data are limited in size by the maximum data return threshold set in the control and monitoring system 24. In addition, the method 230 may include receiving (block 242) a modification notification from the server 134 when a second component (e.g., one of the other clients 170) identifies, modifies, or deletes data relating to the one or more criteria, as described with reference to the fourth block 178 of FIG. 7. The method 230 also may include unsubscribing (block 244) to the data, via the client 132, by providing an unsubscribe request to the server 134, and ceasing (block 246) to receive notifications relating to the one or more criteria based upon the unsubscribe request. These correspond to the operations indicated by the fifth block 180 of FIG. 7.

The arrangement of functional components 130 and the method 230 described above enable a user to perform live data queries on devices in the control and monitoring system 24. A user does not have to submit a new query, even though the underlying data model 144 is dynamically changing in response to automation system execution. The server 134 is configured to provide updates to the view model 142 automatically. This may offer several advantages over traditional control system data querying mechanisms. First, it may enable the use of simpler software in the client components 152. That is, the interface (e.g., view 140) through which a user makes initial requests may be simplified, since only one request is sent to request the original data and subscribe to all additional changes in data matching the original request criteria. As a result, the automation control system data may be monitored using relatively simple plant devices, such as smart phones or tablets. In addition, the functional components 130 as described herein are configured specifically to address changes in data, not just static data requests. The use of distributed state change notifications allow the server 134 to respond in the same way to changes in data as it does to the requested data itself. With this unified mechanism for both initial data responses and data updates, the system may conserve communication and computational bandwidth since it is not relying on multiple requests for full state information matching the desired criteria. This may also improve the time response of the server 134 in providing new information requested in the query.

Communicating State Change

Having now discussed the benefits of using distributed state change notification for data querying, a more detailed discussion of the distributed state change notification will be provided. As discussed above, FIG. 2 is a diagrammatical representation of an exemplary control and monitoring system 24 adapted to provide component state information using delta scripts in accordance with embodiments of the present techniques. As illustrated, the control and monitoring system 24 may include one or more human machine interfaces (HMI) 26 and one or more control/monitoring devices 30 adapted to interface with components of a process 28. The control/monitoring devices 30 may include one or more processors and a data storage device useful for performing tasks on the control and monitoring system 24 (e.g., process control, remote equipment monitoring, data acquisition, etc.). Further, a programming terminal 46 may enable one or more users to configure attributes of the HMI 26 and/or control/monitoring devices 30.

In the control environment, the state of various objects (e.g., control programs, tags, module configuration, and HMI screens) of the control and monitoring system 24 may be stored in memories (e.g., hard drives, read-only memory, and/or random-access memory) of various components of the control and monitoring system 24 (e.g., a programming terminal 46, the control/monitoring device 30, I/O modules, and/or HMI terminals 26. Each of the components of the control and monitoring system 24 may operate independently in a loosely coupled, asynchronous fashion. In other words, the components may communicate data (e.g., configuration data, data sets requested in a query, data updates) between each other via asynchronous notifications, as the data becomes available and without sending multiple notifications at the same time. Further the components may be implemented with different programming technologies (e.g., C++, Java, and/or C#). As changes are made to the state information of the control environment objects, the state information may need to be synchronized with the state information residing on the other components, such that the components may continually understand the state of the objects within the control and monitoring system 24. In accordance with present embodiments, to stay apprised of state information, automation components that store state information may receive data referred to as state deltas 43 (e.g., state elements that have changed), while not receiving state elements that have not changed and thus are already present in the stored state information on the various components storing the state information. For example, state deltas 43 may include any data that has changed due to an action within the control and monitoring system 24. By providing the state deltas 43 and not providing the unchanged state information, increased efficiency may be observed. For example, in a traditional control and monitoring system 24 with 100 state elements, each of the 100 state elements may be provided to each component storing that object's state information. By only providing the state deltas 43, components of the control and monitoring system 24 may only transmit data for the elements that were changed. Thus, if only one element of the 100 state elements is changed, the 99 other elements would not be transmitted, thus reducing network traffic relative to traditional systems. Further, providing only the state deltas 43 may reduce the potential of inadvertently overwriting state change information that is generated elsewhere within the control and monitoring system 24. For example, in the case of the 100 state elements mentioned above, when all 100 state elements are transmitted to the other components, the 99 unchanged elements may result in an overwrite of changes made to one of those 99 components elsewhere. By providing only the changed elements (e.g., the state deltas 43), the 99 unchanged elements will not be affected by the one element that was changed and communicated to the other components.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation control and monitoring system, comprising:
 a server, comprising a processor configured to receive a subscription request from a client component, the subscription request providing one or more criteria to the server, wherein the processor is configured to:
  receive, via the subscription request, a limit designating a maximum amount of data to be returned in a notification;
  identify a set of data associated with the one or more criteria;
  provide at least a first subset of the set of data, via a first notification, to the client component based upon the one or more criteria in the subscription request;
  limit the first notification to the designated maximum amount of data; and
  provide, via additional notifications based on the subscription request, additional sets of data, modifications to the set of data, or both, when additional data or modifications corresponding to the one or more criteria are available; wherein when the set of data exceeds the maximum amount of data, the additional notifications comprise at least one second subset of the set of data not sent in the first notification due to the limit, wherein each of the additional notifications do not exceed the limit.

2. The automation control and monitoring system of claim 1, comprising the client component, wherein the client component is configured to provide a data filter in the subscription request.

3. The automation control and monitoring system of claim 1, wherein the processor is configured to return the set of data having a specific set of properties to the client component, wherein the specific set of properties is provided in the subscription request.

4. The automation control and monitoring system of claim 1, comprising: another component configured to identify additional data corresponding to the one or more criteria, update data corresponding to the one or more criteria, delete data corresponding to the one or more criteria, or a combination thereof; wherein the processor is configured to provide additional notifications corresponding to the identified additional data, updated data, or deleted data to the client component.

5. The automation control and monitoring system of claim 1, wherein the processor is configured to stop sending notifications to the client component upon receiving an unsubscribe request from the client component.

6. The automation control and monitoring system of claim 1, wherein the processor is configured to provide an update of the set of data in an additional notification when the update of the set of data is not immediately available for the processor to send.

7. The automation control and monitoring system of claim 1, wherein the processor is configured to provide the first notification and the additional notifications asynchronously.

8. A method, comprising:
 subscribing to a query, via a client component in an automation control and monitoring system, by providing one or more criteria in a subscription request and a limit designating a maximum amount of data to be returned in a notification, to a processor of the automation control and monitoring system;
 receiving, from the processor, a first notification comprising a first portion of data relating to the one or more criteria of the subscription request, wherein the first notification is limited by the designated maximum amount of data; and
 receiving, from the processor, one or more additional notifications comprising additional portions of data relating to the one or more search criteria of the subscription request that become available after subscribing to the query, wherein the one or more additional notifications comprise a set of data not sent in the first notification due to the limit and the one or more additional notifications do not exceed the limit.

9. The method of claim 8, wherein the first portion of data and the additional portions of data are limited in size by a maximum data return threshold set in the automation control and monitoring system.

10. The method of claim 9, comprising sending the maximum data return threshold in the subscription request.

11. The method of claim 9, comprising defining the maximum data return threshold in a server.

12. The method of claim 8, comprising receiving a modification notification, from the processor, when another component identifies data relating to the one or more criteria, modifies data relating to the one or more criteria, or deletes data relating to the one or more criteria.

13. The method of claim 8, comprising: unsubscribing to the query, via the client component, by providing an unsubscribe request to a server; and ceasing to receive notifications relating to the one or more criteria based upon the unsubscribe request.

14. An automation control and monitoring system, comprising:
 a server comprising a processor;
 a graphical user interface of the automation control and monitoring system;
 a view model configured to request and receive data relevant to the graphical user interface from the processor via a live query, the request comprising a limit designating a maximum amount of data to be returned in a notification; and
 a data model comprising a model of objects that the processor accesses, wherein the processor is configured to:
  access the requested data from the data model; and
  provide the requested data, including any additions, modifications, or both to the requested data, to the view model via asynchronous notifications to the view model, wherein the requested data is provided according to the limit, such that the requested data does not exceed the limit, by: providing multiple notifications that do not exceed the limit, until a full set of the requested data is provided.

15. The automation control and monitoring system of claim 14, wherein the asynchronous notifications are limited in size by a maximum data return threshold set in the automation control and monitoring system, and the processor is configured to provide portions of the requested data in multiple asynchronous notifications when an amount of the requested data is above the maximum data return threshold.

16. The automation control and monitoring system of claim 14, wherein the view model is configured to subscribe to a query by sending an asynchronous subscription request to the server, the subscription request comprising one or more criteria that identifies the query.

17. The automation control and monitoring system of claim 16, wherein the processor is configured to: detect an identification of data relating to the one or more criteria, a deletion of data relating to the one or more criteria, or a modification of data relating to the one or more criteria; and provide an asynchronous modification notification of the identification, deletion, or modification to the view model.

18. The automation control and monitoring system of claim 17, wherein: the view model is configured to send an unsubscribe request to the server when the data is no longer needed by the view model; and the server is configured to cease sending asynchronous modification notifications to the view model when the server receives the unsubscribe request.

19. The automation control and monitoring system of claim 14, wherein the processor is configured to: detect a first portion of the requested data that is available for transmission; detect a second portion of the requested data that is not available for transmission; send a first asynchronous notification with the first portion to the view model; and send a second asynchronous notification with the second portion to the view model when the second portion is available for transmission.

20. The automation control and monitoring system of claim 14, comprising a server proxy, wherein the server proxy comprises machine-readable code with instructions to: connect the view model to the server; and transform any asynchronous notifications received from the server such that the data may be interpreted by the view model.

21. The automation control and monitoring system of claim 14, comprising a server stub, wherein the server stub comprises machine-readable code with instructions to receive and transform a request sent from the view model to the server, such that the request may be interpreted by the server.

22. An automation control and monitoring system, comprising:
a client processor of the automation control and monitoring system that provides a subscription request to a server, the subscription request providing one or more criteria and a limit designating a maximum amount of data to be returned in a notification, to the server, wherein the client processor:
receives a set of data, via a first notification, from the server based upon the one or more criteria in the subscription request, wherein the first notification is limited by the designated maximum amount of data; and
receives, via additional notifications, additional sets of data, modifications to the set of data, or both, when additional data or modifications corresponding to the one or more criteria in the subscription request are available, wherein the additional notifications comprise a set of data not sent in the first notification due to the limit and the additional notifications do not exceed the limit.

23. The automation control and monitoring system of claim 22, wherein the client processor provides, in the subscription request, at least one of a data filter, a specific set of properties to be returned by the server, or a maximum amount of data to be returned in a notification.

24. The automation control and monitoring system of claim 22, wherein the client processor:
receives a modification notification, from the server, when another component identifies data relating to the one or more criteria, modifies data relating to the one or more criteria, or deletes data relating to the one or more criteria.

25. The automation control and monitoring system of claim 22, wherein the client processor:
sends an unsubscribe request to the server; and
stops receiving additional notifications corresponding to the one or more criteria when the server receives the unsubscribe request.

* * * * *